United States Patent [19]

Yazu et al.

[11] 4,343,651
[45] Aug. 10, 1982

[54] SINTERED COMPACT FOR USE IN A TOOL

[75] Inventors: Shuji Yazu; Akio Hara, both of Itami, Japan

[73] Assignee: Sumitomo Electric Industries, Ltd., Osaka, Japan

[21] Appl. No.: 136,459

[22] Filed: Mar. 31, 1980

[30] Foreign Application Priority Data

Mar. 29, 1979 [JP] Japan .................................. 54-37984
Dec. 29, 1979 [JP] Japan ................................ 54-171512
Mar. 10, 1980 [JP] Japan .................................. 55-31786

[51] Int. Cl.³ ............................................. B22F 3/14
[52] U.S. Cl. ...................................... 75/238; 75/239; 75/236; 75/202; 75/203
[58] Field of Search ................. 75/238, 244, 205, 203, 75/204; 51/307, 309

[56] References Cited

U.S. PATENT DOCUMENTS

| 3,743,489 | 7/1973 | Wentorf et al. | 51/309 X |
| 3,852,078 | 12/1974 | Wakatsuki et al. | 51/309 X |
| 3,868,234 | 2/1975 | Fontanella | 51/309 |
| 3,918,219 | 11/1975 | Wentorf et al. | 51/307 |
| 3,944,398 | 3/1976 | Bell | 51/309 X |
| 3,982,911 | 9/1976 | Lee | 51/309 X |
| 4,063,909 | 12/1977 | Mitchell | 51/309 |
| 4,108,614 | 8/1978 | Mitchell | 51/309 X |
| 4,110,084 | 8/1978 | Lee et al. | 51/307 |
| 4,225,322 | 9/1980 | Knemeyer | 51/309 X |
| 4,255,165 | 3/1981 | Dennis et al. | 51/309 |

FOREIGN PATENT DOCUMENTS

| 2756512 | 6/1978 | Fed. Rep. of Germany . |
| 55-18531 | 2/1980 | Japan . |
| 55-97448 | 7/1980 | Japan . |
| 55-94458 | 9/1980 | Japan . |
| 55-113859 | 9/1980 | Japan . |

OTHER PUBLICATIONS

"Metal Cutting Tool Tip with Improved Abrasion Resistance", Hara et al., *Chemical Abstracts*, vol. 91, article 161,863c, Apr. 1979.

Primary Examiner—L. Dewayne Rutledge
Assistant Examiner—J. J. Zimmerman
Attorney, Agent, or Firm—Wenderoth, Lind & Ponack

[57] ABSTRACT

An improved sintered compact for use in a cutting tool is proposed which comprises 80 to 95 volume % of high pressure form boron nitride, a binder material which is a carbide, a nitride and/or a carbonitride of a IVb and Vb transition metal in the periodic table, and aluminum compounds. It may further include copper and/or iron group metal or metals. The sintered compact obtained has high hardness even though the sintering pressure and temperature are relatively low.

6 Claims, 2 Drawing Figures

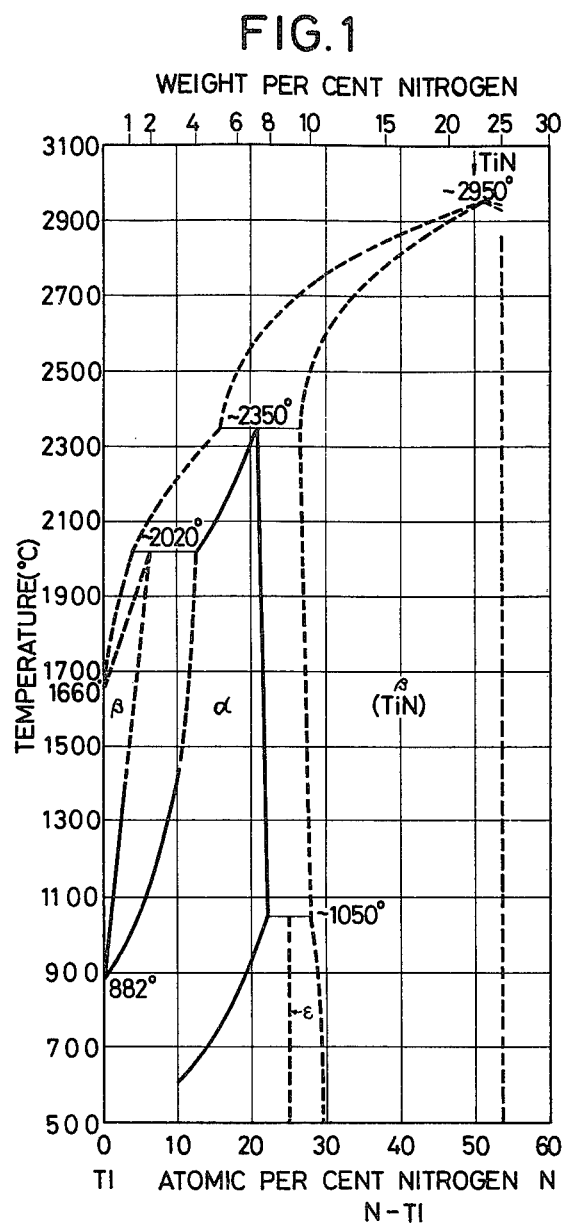

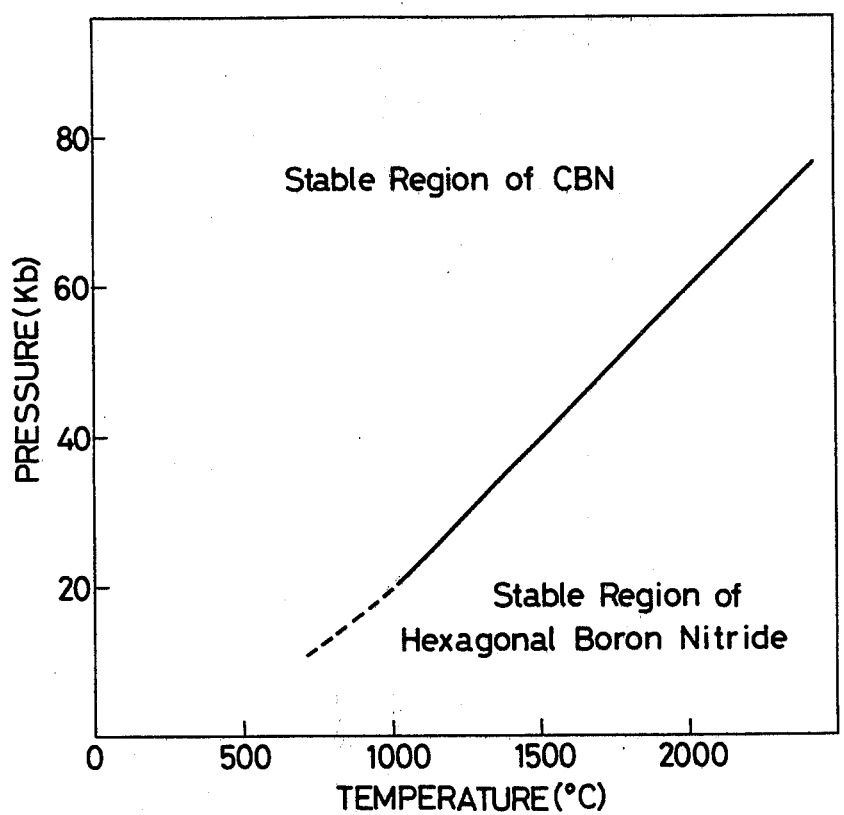

SINTERED COMPACT FOR USE IN A TOOL

The present invention relates to a sintered compact for a machining tool.

Cubic form boron nitride (hereinafter referred to as CBN) has the second highest hardness next to diamond and is synthesized under super-high pressure and high temperature conditions. CBN has been used as abrasive grain for grinding. For cutting, CBN compact bonded by metal such as cobalt has been used for some applications. When used as a cutting tool, however, such metal bonded CBN has shortcomings in that reduction in the wear resistance results from the softening of the bonding metal at high temperatures and in that the tool is liable to damage due to welding to a workpiece.

A primary object of the present invention is to provide an improved CBN sintered compact suitable for use as a cutting tool by using as a binder material hard metal compounds having high strength and high heat resistance.

Other objects and advantages of the present invention will become apparent from the following description taken with reference to the accompanying drawings; in which FIG. 1 is a phase diagram of TiN showing the feature of the process for producing a sintered compact according to this invention; and FIG. 2 is a pressure vs. temperature chart showing the range in which CBN is stable.

As mentioned above, CBN has high hardness, excellent heat resistance and excellent wear resistance. Various attempts have been made to sinter solely the CBN material. As disclosed in Japanese Patent Publication No. 39-8948, for example, it requires sintering under super-high pressure at high temperature, say, about 70 kb or higher and 1900° C. or higher. Such high-pressure and high-temperature conditions are possible with a super-pressure apparatus now available, but such an apparatus adapted for industrial use would not be so practical because the working life of the high-pressure and high-temperature producing unit is limited. Also, sintered compacts made of only CBN have high hardness, but has insufficient toughness for use as a machining tool. In view of the difficulties of manufacturing and because of insufficient toughness, the addition of suitable binder materials to CBN has been proposed to obviate such shortcomings.

One of the prior art processes is to use a metal, such as cobalt, as a binder material. Sintering of CBN mixed with non-metallic compounds, such as $Al_2O_3$ and $B_4C$, has also been tried. In the former process, sintering is performed at temperatures where the metal binder material such as cobalt melts, namely, it is a liquid phase and sintered under high pressure. In the latter process, the binder material does not melt and sintering is done with the binder material in a solid phase.

The inventors of the present invention have already invented a sintered compact for use in a tool comprising 40 to 80 volume % of high pressure form boron nitride, the balance being a matrix of binder material such as a carbide, a nitride, a boride and a silicate of a IVb, Vb and VIa metal of the periodical table, the matrix forming a continuous bonding structure in a sintered body, and filed a patent application (Japanese Patent Laid open Publication 53-77811). In the process according to the above-mentioned invention, too, CBN is sintered with the binder material in a solid phase. However, because the content of the binder material is relatively high, the pressure and temperature required to obtain a densely concentrated sintered compact do not have to be so high as in the sintering of CBN without any binder material.

The inventors have conducted experiments in which the content of CBN was further increased. If its content was higher than 80 volume %, sintered compact having a sufficiently high strength was not obtained when powder of CBN and powder of the above-mentioned compounds of a IVb, Vb or VIa metal in the periodical table were mixed together uniformly and were sintered under super-high pressure at high temperature. Examination of the fractured surface of the sintered compact obtained showed that fracture often occurred between the CBN particles or between the CBN particles and the particles of compounds (binder material). This is supposed to be due to low bonding strength between the CBN particles and between the CBN particles and the binder material particles. This means that if the content of CBN is too high, the degree of sintering decreases so that a sintered compact having a sufficiently high strength cannot be obtained.

In order to solve this problem, the inventors have conducted various experiments. As a result, it has been found that even if the content of CBN is higher than 80 volume %, a sintered compact having high strength can be obtained by adding aluminum compounds to the binder material which is a carbide, a nitride or a carbonitride of a IVb and Va transition metal, formulated as $MC_x$, $MN_x$ or $M(CN)_x$, (wherein M represents the transition metal and x the amount of atomic voids in the lattice structure), x being smaller than a certain value. The inventors have made similar experiments with wurtzite form boron nitride (hereinafter referred to as WBN) which is another form of the high pressure form boron nitride. The results of the experiments were similar to those with CBN.

As exemplified in FIG. 1 showing a phase diagram for TiN, the phase having a structure of an NaCl type exists in a wide range of composition for a carbide, nitride and carbonitride of a IVb and Vb metal in the Periodic Table. The degree of sintering was improved by using a binder material having an x value of below 1, that is, having a correspondingly higher amount of atomic voids in the lattice structure relative to C and N. It was also confirmed that the degree of sintering was improved by adding an aluminum compound or compounds to $MC_x$, $MN_x$ or $M(C.N)_x$ rather than using $MC_x$, $MN_x$ or $M(C.N)_x$ singly as a binder material. It has also been found that the addition of a small amount of copper or a mixture of copper and at least one iron group element such as iron, nickel and cobalt further improves the degree of sintering and increases the strength of the sintered compact produced.

The value x for $MC_x$, $MN_x$ and $M(C.N)_x$ used as a binder material should preferably be 0.95 or lower. Such a binder material as $MC_x$, $MN_x$ and $M(C.N)_x$ may be used singly, in combination with one another, or as a solid solution compound. The content of aluminum in the binder material should preferably be 5% or higher. The total content of copper and iron group metals in the binder material should preferably be 1% or higher.

The inventors have made a series of trial productions with the content of CBN in the sintered compact being 85 volume % and while changing the value x for $MC_x$, $MN_x$ and $M(C.N)_x$ and the contents of Al, or of Al and Cu, or of Al and Cu and iron group metals. Evaluation of the sintered compacts produced as a cutting tool material showed that sintered compacts having high strength and excellent performances as a cutting tool were produced when x was 0.50 to 0.95 and the content of aluminum in the matrix was 5 to 30 weight % and the content of copper or of copper and iron group metal in the matrix was 1 to 50 weight %. When the iron group was metal added in the matrix, 25 weight % or less was suitable.

The sintered compact according to the present invention comprises 80 to 95 volume % of high pressure form boron nitride. In this region of composition, the higher the content of CBN, the higher the of hardness the sintered compact. If the CBN content is over 95%, some reduction in toughness required for use as a cutting tool is observed. For lower than 80 volume % of CBN, the matrix in the sintered compact forms a continuous phase in the structure so that the sintered compact will not have a sufficiently high hardness.

We shall describe why the use of the binder material according to the present invention improves the degree of the sintering of high pressure form boron nitride. Taking TiNx as an example, the hardness at ordinary temperature of the sintered compact made from TiNx only is the highest when TiNx has a value x of about 0.7. But, at high temperatures, the lower the value x of the TiN used, the lower the hardness of the sintered compact. In the sintering of a mixture of CBN and TiNx under super-high pressure at high temperature, the CBN particles are less liable to deform whereas the particles of TiNx are liable to deform. The TiNx having a lower x value is the more liable to deform and penetrate between the CBN particles, making a more dense the sintered compact obtained. The same is true for other binder materials formulated as MCx, MNx and M(C.N)x. However, this does not suffice to attain a sufficient bonding strength between the CBN particles. If the dissolution of the hard particles into the matrix and their re-deposition occur as in the liquid phase sintering for a WC-Co cemented carbide, for example, a sintered compact can be obtained which has a high bonding strength between the hard particles and the matrix and between the hard particles themselves.

We have found that a similar phenomenon takes place when aluminum compounds exist in the binder material. As the amount of aluminum compounds added to the binder material, MCx, MNx or M(C.N)x, increases, the degree of sintering is improved. Even if the sintering temperature is not so high, sintered compacts having a high hardness can be obtained. After grinding the sintered compact produced with a diamond grindstone and lapping it, we examined it. When the amount of aluminum added was 5% by weight or larger in the bonding material, the exfoliation of the CBN particles was hardly observed.

However, as a result of examination of their fractured surface, most of the CBN particles showed a transcrystalline fracture, but some of them showed an intercrystalline fracture. Next, we have tried to add copper or copper and iron group metal to the binder material in addition to aluminum and examined the fractured surface of the sintered compact obtained. No intercrystalline fracture was observed. The reason for this result is presumed as follows: The copper and iron group metal react with the aluminum added to the binder material and excessive IVb or Vb transistion metal M in the binder material MCx, MNx or M(C.N)x, forming a liquid phase having a low melting point. The reaction products permeate into the interface between the CBN particles and the binder materials. It is thought that because these products, M-Al-Cu or M-iron group metal, have a good affinity with CBN and the binder materials MC, MN or M(C.N), they increase the bonding strength between the CBN particles themselves and between the CBN particles and the binder materials.

In the sintered compact not including copper or any iron group metal in the matrix, a relatively large amount of borides such as $MB_2$ is formed at the interface between the CBN particles and the binder material particles. Because such borides are usually brittle, they make the sintered compact subject to fracture, if thier content is high. It is assumed that in the sintered compact including copper and an iron group metal in the matrix, the formation of borides might be depressed and therefore the CBN particles be very tightly bound together and with the matrix.

As described before, in accordance with the present invention, sintering at relatively low temperatures is possible because a liquid phase having a low melting point occurs during the sintering process.

In the sintered compact according to the present invention, copper and iron group metals are not present as pure metals but exist either as a solid solution in the matrix or reacts with aluminum or excessive transition metal M in the binder material MCx, MNx or M(C.N)x and exists as an intermetallic compound. Therefore, no decrease in the strength at high temperatures takes place. If the content of copper and iron group metals in the matrix exceeds 50% by weight, however, a part of them does not react with aluminum or excessive transition metal, but tends to exist in the sintered compact in the form of pure metal. Therefore, the hardness of the sintered compact decreases and its performance as a tool material impairs.

Aluminum, copper and iron group metal may be added in various ways. The most simplest method is to add such materials to a powdery mixture of the CBN particles and the binder material particles before sintering. But, these metals are difficult to power into particles finer than 1 micron. With coarse particles, the structure of the sintered compact would not be uniform.

The most preferable method for the addition of aluminum is to cause the metal aluminum to react with the excessive transition metal M in the MCx, MNx or M(C.N)x material to form an intermetallic compound and then powder it to a desired particle size. With this method, a powder of the binder material finer than one micron and including such intermetallic compounds can be easily obtained. Alternatively, metal aluminum may be made to react with a transition metal M to form M-Al intermetallic compounds (such as $TiAl_3$, TiAl, $Ti_2Al$, $ZrAl_3$ and ZrAl) in which the powder may be easily ground. Still further, aluminum may be added in the form of other compounds, including nitrogen, such as AlN, $Ti_2AlN$ and $Zr_2AlN$.

Also, the most preferable method for the addition of copper and iron group metal is to cause them to permeate into the sintered compact from outside during sintering or to cause them to react with the binder material before sintering as in the case of aluminum.

The particle size of the CBN crystals used in the present invention should preferably be less than 10 microns. If the CBN particles are too coarse, the sintered compact obtained have insufficient strength. If fine CBN particles are used, a good machined surface is obtainable for the sintered compact produced. This is required particularly for use as a cutting tool.

The binder material used in the present invention should be extremely fine having a particle size of particles 1 micron or less. This is another feature of the present invention. Therefore, the particles of the binder material can be distributed uniformly between the CBN particles, even though the content of CBN in the sintered compact is relatively high, so that the sintered compact produced will have a high hardness. Particularly when a nitride of a IVb metal is used as the binder material, a sintered compact having excellent toughness and wear resistance can be produced.

In accordance with the present invention, sintering is done under a pressure of higher than 20 kb at a temperature of higher than 900° C. by use of a superpressure apparatus. Preferably, the sintering pressure should be 30 to 70 kb and the sintering temperature should be 1,100° to 1,500° C. The upper limits of these preferable conditions are within the practical working range of a super-pressure apparatus on an industrial scale. The pressure and temperature conditions must be in the range on the diagram shown in FIG. 2 where CBN is stable.

In using such an excellent sintered compact as a cutting tool, it has to be brazed only at the cutting edge. The sintered compact according to the present invention performs well when brazed on to a cemented carbide so that it is excellent in strength, toughness and heat conductivity. However, if it were brazed directly to a cemented carbide, the bonding strength would not be sufficient for use in intermittent cutting. In order to assure sufficient bonding strength, the sintered compact according to the present invention should preferably be brazed to a cemented carbide through an intermediate layer which has a thickness of 2 mm or less and comprises 0 to 70 volume % of CBN, the balance being a matrix consisting of a carbide, nitride or carbonitride of Ti, Zr and Hf, or mixtures thereof or solid solution compounds and 0.1 weight % of Al or Si.

The following examples are included merely to aid in the understanding of the invention.

EXAMPLE 1

$TiN_{0.82}$ powder was mixed with aluminum powder in a weight ratio of 80:20, heated to 1,000° C. for 30 minutes in a vacuum furnace, and powdered so as to provide a binder powder of 0.3 micron in average particle size. According to the X-ray diffraction studies, the binder powder was found to contain, besides TiN, such compounds as $Ti_2AlN$, $TiAl_3$ and $TiAl$ generated by the reaction of TiN with Al, but no metallic Al; the relatively excess Ti relative to N in the $TiN_{0.82}$ reacted with Al added to produce such compounds.

CBN powder of 3 microns in average particle size was mixed with the binder powder in a volume ratio of 90:10, and the resultant powder mixture was formed to a green compact. The green compact was then placed in a girdle type super-pressure apparatus. At first the pressure was increased to 50 kb, then the temperature was raised to 1,250° C., and was kept at the temperature for 20 minutes.

The sintered compact thus obtained was ground with a diamond wheel, and further polished with diamond paste. Under an optical microscope, the polished face was densely sintered and free from voids. The sintered compact had a Vickers hardness of about 4,800 under a load of 5 kg.

The sintered compact was cut with a diamond cutter into a cutting insert. Using this insert, a WC-15% Co cemented carbide punch of about 1,200 Vickers hardness was cut under conditions of 18 m/min. cutting speed, 0.2 mm depth of cut and 0.1 mm/revolution feed. For the purpose of comparison, the same punch as the above was cut with an insert prepared from a marketed sintered compact having about 90% volume % of CBN bonded together with metals mainly of Co. The maximum flank wear width of the sintered compact of the invention reached 0.12 mm whereas that of the conventional insert reached 0.23 mm. With the aid of the X-ray diffraction studies, there were detected in the compact of the invention, besides CBN and TiN, a trace amount of $TiB_2$ and AlN, which were possibly produced by the reaction of CBN with Ti-Al intermetallic compounds and $Ti_2AlN$ contained in the binder powder before the sintering.

EXAMPLE 2

A fine powder of metallic Ti was heated in a stream of pure nitrogen at various temperatures to control the nitrogen content in the nitride thus produced, as shown in TABLE 1a.

TABLE 1a

| Binder No. | Compositions of $TiN_x$ | | | Al |
|---|---|---|---|---|
| | $TiN_{0.82}$ | $TiN_{0.72}$ | $TiN_{0.55}$ | |
| 1 | 80 | | | 20 |
| 2 | | 90 | | 10 |
| 3 | | 80 | | 20 |
| 4 | | 70 | | 30 |
| 5 | | | 70 | 30 |
| (% by weight) | | | | |

The nitride was then mixed with Al powder, heated and powdered in the same manner as in EXAMPLE 1 to provide binder powders Nos. 1–5 in TABLE 1a.

TABLE 1b

| Binder No. | $TiN_{0.72}$ | $ZrN_{0.70}$ | $TiC_{0.90}$ | WC | Al |
|---|---|---|---|---|---|
| 6 | 70 | | 10 | | 15 |
| 7 | 70 | | | 10 | 15 |
| 8 | | 80 | | | 20 |
| 9 | 40 | 40 | | | 20 |
| (% by weight) | | | | | |

Similarly, the binders Nos. 6–9 of the composition shown in TABLE 1b were prepared.

The thus obtained binder was mixed with CBN powder of 3 microns in average particle size, to form powder compositions as tabulated in TABLE 2.

TABLE 2

| Powder Compositions | CBN (vol. %) | Binder No. Used | Vickers Hardness Conditions | |
|---|---|---|---|---|
| | | | Group 1 | Group 2 |
| A | 80 | 1 | 3,200 | 3,300 |
| B | 85 | 1 | 4,100 | 4,500 |
| C | 97 | 1 | 2,800 | 3,000 |
| D | 90 | 2 | 3,400 | 3,800 |
| E | 90 | 3 | 4,200 | 4,300 |
| F | 90 | 4 | 4,500 | 4,500 |
| G | 90 | 5 | 4,600 | 4,600 |
| H | 95 | 5 | 4,000 | 4,600 |

In the same manner as in EXAMPLE 1, green compacts were prepared, and the treating under a pressure of 50 kb at a temperature of 1,150° C. for 20 minutes provided the sintered compacts of group 1, and the treating under a pressure of 50 kb at a temperature of 1,400° C. for 20 minutes provided the sintered compacts of group 2. The Vickers hardness of the sintered compacts thus obtained are also tabulated in TABLE 2.

Considering the compacts A, B and C, the first one containing 80 volume % of CBN had a Vickers hardness of lower than 3,500, and the last one containing more than 97 volume % of CBN has also a small hardness. In the latter case, since the compact has only an insufficient amount of binder therein so that the treating conditions used failed to form sufficiently densely sintered structure. When a compact contains CBN in the same volume % as in the compacts D, E and F, on the other hand, the more the Al content within the range examined, the larger the hardness, and even the treatment under a lower temperature successfully provided a compact of high hardness. As a general tendency, when a binder contains $TiN_x$ having a smaller value x and a larger amount of Al, a better sintering is achieved, so that even the low temperature treatment is capable of affording a compact of sufficiently high hardness.

EXAMPLE 3

A mixture of CBN powder of 3 microns in the average particle size and each binder in TABLE 1 in a volume ratio of 85:15 was sintered under the same conditions as in EXAMPLE 1, to provide a sintered compact. The compacts thus obtained had more than 4,000 Vickers hardness.

EXAMPLE 4

A WBN powder of less than 1 micron in the average particle size prepared by the so-called shock wave method was mixed with each binder listed in TABLE 1 in a volume ratio of 85:15, and was sintered in the same manner as in EXAMPLE 1, to provide the sintered compact of 5,000 Vickers hardness.

EXAMPLE 5

A powder mixture of CBN and a binder of EXAMPLE 1 was placed on a disk substrate 10 mm in diameter and 3 mm in thickness of (MoW)C base cermet consisting of 89.5 weight % of $(Mo_{0.9}W_1)_1C_{0.9}$ 5 weight % of Co, 5 weight % of Ni and 0.5 weight % of Fe, and then sintered in the same manner as in EXAMPLE 1 under a pressure of 45 kb at a temperature of 1,200° C. by the use of a super-pressure apparatus.

The thus obtained complex compact had a 1 mm-layer of hard sintered compact containing 90 volume % of CBN bonded on the disk substrate. The complex compact was cut into two, and the section thereof was studied by an X-ray micro-analyzer. It was found out that little amount of Co and Ni, bonding metals of the cermet, permeated from (MoW)C cermet into the sintered compact, and further that at the interface Ti in the sintered compact dissolved in part in the cermet to form solid solution compounds of (MoWTi)C type.

The sintered compact was brazed to a corner of a WC-base cemented carbide throw-away insert to make a cutting insert. For the purpose of comparison, another insert of the same size and of Vickers hardness 3,000 was made from a sintered compact containing 60 volume % of CBN and the balance binder which consisted of 10 weight % of Al and 90 weight % of TiN. As a cutting test, a chilled roll of Shore hardness 83 was cut by the two inserts under the conditions of 50 m/min. cutting speed, 1 mm depth of cut and 0.5 mm/revolution feed. After a one-hour cutting, the maximum flank wear width of the insert according to the invention reached 0.15 mm while the comparison insert did 0.3 mm.

EXAMPLE 6

The binder powders of compositions shown in TABLE 3 were prepared in the same manner as in EXAMPLE 1.

TABLE 3

| Binder No. | Formulas | Compounds wt. % | Al wt. % |
|---|---|---|---|
| 10 | $HfN_{0.9}$ | 80 | 20 |
| 11 | $TiC_{0.9}$ | 90 | 10 |
| 12 | $ZrC_{0.9}$ | 90 | 10 |
| 13 | $VC_{0.9}$ | 90 | 10 |
| 14 | $NbC_{0.9}$ | 90 | 10 |
| 15 | $TaC_{0.9}$ | 90 | 10 |
| 16 | $Ti(C_{0.1}, N_{0.8})$ | 80 | 20 |
| 17 | $Zr(C_{0.5}, N_{0.4})$ | 85 | 15 |
| 18 | $Nb(C_{0.3}, N_{0.6})$ | 85 | 15 |
| 19 | $(Ti_{0.5}, Ta_{0.5})$ $(C_{0.3}, N_{0.6})$ | 90 | 10 |
| 20 | $(Ti_{0.7}, W_{0.3})$ $(C_{0.7}, N_{0.2})$ | 90 | 10 |

CBN powder of 3 microns in average particle size was mixed with each binder in a volume ratio of 90:10, and the resulting powder mixture was sintered under a pressure of 50 kb at a temperature of 1,300° C. for 20 minutes using a super-pressure apparatus. The results of Vickers hardness measurements using a 5-kg load on the obtained compacts are tabulated in TABLE 4.

TABLE 4

| Compacts | CBN vol. % | Binder No. Used | Vickers hardness |
|---|---|---|---|
| I | 90 | 10 | 4,300 |
| J | 90 | 11 | 4,100 |
| K | 90 | 12 | 4,100 |
| L | 90 | 13 | 3,900 |
| M | 90 | 14 | 4,000 |
| N | 90 | 15 | 4,000 |
| O | 90 | 16 | 4,500 |
| P | 90 | 17 | 4,500 |
| Q | 90 | 18 | 4,500 |
| S | 90 | 19 | 4,700 |
| T | 90 | 20 | 4,200 |

EXAMPLE 7

$TiN_{0.83}$ powder and Al powder were mixed together in a weight ratio of 80:20 and formed to a binder powder in the same manner as in EXAMPLE 1. In the thus obtained binder were detected compounds generated by the reaction of TiN with Al, such as $Ti_2AlN$, $TiAl_3$ and TiAl, besides TiN; the Al-containing compounds were produced by the reaction of excess Ti relative to N in $TiN_{0.83}$ with Al added.

In a molybdenum capsule of 14 mm and 10 mm in outside and inside diameters, respectively, a WC-6% Co cemented carbide substrate coated with a powder mixture containing 60 volume % of CBN and the residue being a mixture of TiN and a small amount of Al was placed, and thereafter 0.30 g of a powder mixture of 90 volume % of CBN of 3 microns in the average particle size and 10 volume % of the above binder powder. Further thereon was placed another cemented carbide 10 mm in outside diameter and 2.2 mm in height having thereon a 2μ-thick Cu layer vacuum evaporated. After being stopped with a Mo stop, the capsule was placed in a super-pressure apparatus. The pressure therein was first increased to 50 kb, then the temperature was raised to 1,250° C. and kept thereat for 20 minutes. The thus obtained sintered complex compact was cut with a diamond wheel until hard sintered face appeared, and the face was further polished with diamond paste. The face was found densely sintered and free from air holes under an optical microscope. The hard sintered compact was also found to have been firmly bonded with the cemented carbide substrate through the bonding layer therebetween containing CBN, and had a Vickers hardness of 4,800 by the measurement using a 5-kg load.

With the aid of X-ray micro-analyzer, the sintered compact was found to contain Cu uniformly dispersed therein, and the content thereof was about 3 weight % in the binder. According to the X-ray diffraction studies, CBN, TiN and AlN were detected, but borides such as $TiB_2$ were hardly detected.

In the same manner as above, a complex compact which contained no Cu was prepared, and was found to have a large amount of $TiB_2$ besides CBN, TiN and AlN by X-ray diffraction studies.

The two compacts, one containing Cu and the other not, were formed to cutting inserts. As a cutting test, a WC-15% Co punch of Vickers hardness about 1,200 was cut under the conditions of 18 m/min. cutting speed, 0.2 mm depth of cut and 0.1 mm/revolution feed. For comparison, a further cutting insert was made from a marketed sintered compact having about 90 volume % of CBN bonded with metals mainly of Co, and subjected to the same cutting test as above. As results, the maximum flank wear width of the insert according to the invention was 0.8 mm whereas that of the second insert 0.15 mm, and the third insert 0.25 mm.

EXAMPLE 8

CBN powder of 3μ in average particle size in an amount specified in TABLE 5 was mixed with the binder powder of TABLE 1, to form sample powders.

In the same manner as in EXAMPLE 7, in a molybdenum capsule was placed a WC-6% Co cemented carbide substrate having thereon a coating of a powder mixture of 50 volume % of CBN and the residue being a mixture of Ti(C.N), HfN and Al in a weight ratio of 5:3:2. On the coating the above sample powder was placed together with a Cu foil having different thickness, and then another cemented carbide was placed thereupon. After being stopped with molybdenum stop, the capsule was put in a super-pressure apparatus, and treated under the conditions of 50 kb and 1,280° C. for 20 minutes. The thus obtained complex and compact had a hard sintered compact firmly bonded with the cemented carbide substrate through the interface layer therebetween containing CBN. The Vickers hardness of the compact are also shown in TABLE 5.

TABLE 5

| Compacts | CBN (vol. %) | Binder No. Used | Cu content in Binder (wt. %) | Vickers hardness |
| --- | --- | --- | --- | --- |
| 5A | 85 | 1 | 10 | 4,500 |
| 5B | 85 | 1 | 30 | 4,400 |
| 5C | 85 | 1 | 55 | 2,800 |
| 5D | 80 | 1 | 30 | 3,300 |
| 5E | 90 | 1 | 30 | 4,700 |
| 5F | 97 | 1 | 30 | 3,000 |
| 5G | 90 | 2 | 18 | 3,800 |

TABLE 5-continued

| Compacts | CBN (vol. %) | Binder No. Used | Cu content in Binder (wt. %) | Vickers hardness |
| --- | --- | --- | --- | --- |
| 5H | 90 | 3 | 10 | 4,300 |
| 5I | 90 | 4 | 3 | 4,700 |
| 5J | 90 | 5 | 5 | 4,700 |
| 5K | 95 | 5 | 8 | 4,800 |

Considering the sintered compacts 5A, 5B and 5C, the last having the highest Cu content had the smallest hardness.

On the other hand, the larger the CBN content in the compact, the higher the hardness of the compact, however, when the CBN content reaches 97%, the hardness decreases to 3,000. That is, the compact had an insufficient amount of binder so that the conditions of pressure and temperature used failed to provide a highly dense sintered structure.

In turn, considering the compacts 5G, 5H and 5I, the larger the Al content, the larger the hardness of compact within the range examined.

EXAMPLE 9

Binder powders of the composition shown in TABLE 6 were prepared in the same manner as in EXAMPLE 1. A mixture of 13 volume % of each binder and 87 volume % of CBN of 3 microns in the average particle size was placed in a molybdenum capsule. A copper foil was placed on the powder, and WC-10% Co cemented carbide was further placed on the foil. After stopped by a molybdenum stop, the capsule was placed in a super-pressure apparatus for sintering.

The sintered compact was examined by the use of an X-ray micro-analyzer and was found to contain 7 weight % of Cu in the binder. No boride was detected by the X-ray diffraction studies. The Vickers hardness of all the compacts were more than 4,000.

TABLE 6

| | Compositions | | | | | |
| --- | --- | --- | --- | --- | --- | --- |
| Binder No. | $TiN_{0.72}$ | $ZrN_{0.70}$ | $TiC_{0.90}$ | $Ti(C.N)_{0.85}$ | $Hf_{0.75}$ | Al |
| 21 | 75 | | | | | 25 |
| 22 | | | 80 | | | 20 |
| 23 | | | | 85 | | 15 |
| 24 | 40 | 40 | | | | 20 |
| 25 | | | | | 75 | 25 |
| | | | | | | (% by weight) |

EXAMPLE 10

A powder mixture of $TiN_{0.65}$, Al and Cu in a weight ratio of 70:26:4 was heated at a temperature of 1,000° C. for 30 minutes in a vacuum furnace, and powdered to form a binder powder of 0.5μ in average particle size.

CBN powder of 2μ in average particle size was mixed with the binder powder, and the obtained powder mixture was sintered in the same manner as in EXAMPLE 7. According to the X-ray diffraction studies, a small amount of borides was detected, but no metallic Cu.

A cutting insert was prepared from the sintered compact and subjected to a cutting test. An Inconel 718 workpiece was wet-cut under the conditions of 100 m/min. cutting speed, 0.2 mm depth of cut and 0.05 mm/revolution feed. For comparison, an insert was prepared from a marketed sintered compact having about 90 volume % of CBN bonded by metals mainly of Co, and subjected to the same cutting test. As results, the compact of the invention had the maximum flank wear width of 0.25 mm whereas the conventional insert had 0.45 mm.

EXAMPLE 11

WBN powder of less than $1\mu$ in average particle size produced by shock wave method was mixed with the same binder powder as used in EXAMPLE 10 in a volume ratio of 85:15. Using this powder, a complex compact was prepared in the same manner as in EXAMPLE 7. The Vickers hardness of the compact was 4,800.

EXAMPLE 12

Binder powders having the compositions as shown in TABLE 7 were prepared in same manner as in EXAMPLE 1.

TABLE 7

| | | Binder Compositions | | |
|---|---|---|---|---|
| Binders No. | Formulas | Compounds (wt. %) | Al (wt. %) | Cu (wt. %) |
| 26 | $VN_{0.90}$ | 70 | 20 | 10 |
| 27 | $VC_{0.95}$ | 70 | 10 | 20 |
| 28 | $NbN_{0.90}$ | 70 | 20 | 10 |
| 29 | $NbC_{0.95}$ | 70 | 10 | 20 |
| 30 | $TaC_{0.95}$ | 70 | 5 | 25 |
| 31 | $Nb(C_{0.2}, N_{0.7})$ | 70 | 15 | 15 |
| 32 | $(Ti_{0.8}, Ta_{0.2})$ $(C_{0.2}, N_{0.7})$ | 70 | 10 | 20 |

After heated in a vacuum furnace at 1,000° C. for 30 minutes, the binder materials were ground to an average particle size of 0.3 micron.

CBN powder of $3\mu$ in the average particle size was mixed with the binder powder in a volume ratio of 90:10, placed in a molybdenum capsule and sintered under the conditions of a pressure of 50 kb and a temperature of 1,250° C. for 20 minutes by the use of a super-pressure apparatus in the same manner as in EXAMPLE 7. The Vickers hardness of the thus obtained sintered compacts measured using a 5-kg load are shown in TABLE 8.

TABLE 8

| Compacts | CBN vol. % | Binder No. Used | Vickers hardness |
|---|---|---|---|
| 8A | 90 | 26 | 3,900 |
| 8B | 90 | 27 | 4,000 |
| 8C | 90 | 28 | 4,200 |
| 8D | 90 | 29 | 4,500 |
| 8E | 90 | 30 | 4,500 |
| 8F | 90 | 31 | 4,500 |
| 8G | 90 | 32 | 4,600 |

EXAMPLE 13

A powder mixture of 80 weight % of $TiN_{0.83}$ and 20 weight % of Al was heated and powdered to form a binder powder of $0.3\mu$ in average particle size in the same manner as in EXAMPLE 1. With the aid of the X-ray diffraction studies, there were detected compounds generated by the reaction of TiN with Al such as $Ti_2AlN$, $TiAl_3$ and TiAl in addition to TiN, but no metallic Al; the Ti-Al compounds were generated by the reaction of excess Ti relative to N in the $TiN_{0.83}$ with Al added.

90 volume % of CBN powder of $3\mu$ in average particle size was mixed with 10 volume % of the above binder powder. In a molybdenum capsule of 14 mm outside diameter and 10 mm inside diameter was placed a WC-6% Co cemented carbide substrate of 10 mm outside diameter and 22 mm in height coated with a powder mixture of 60 volume % of CBN and the residue being a mixture of TiN and a small amount of Al, and then thereon 0.30 g of the powder mixture. Further on the mixed powder, there was placed another cemented carbide substrate 10 mm in outside diameter and 22 mm in height having $2-\mu$ thick 9 Cu-1 Ni alloy vacuum evaporated thereon. Then, after being stopped with a molybdenum stop, the capsule was placed in a super-pressure apparatus. The pressure was first increased to 50 kb, then the temperature was raised to 1,250° C. and kept thereat for 20 minutes.

The thus obtained complex compact was cut with the aid of diamond wheel until a hard compact face appeared, and the face was polished with a diamond paste. The face was found densely sintered and free from air holes. Furthermore, the compact was found firmly bonded with the substrate through an interface layer containing CBN. The Vickers hardness measured using a 5-kg load was 4,800.

According to an X-ray micro-analyzer, the compact was found to contain Cu and Ni uniformly dispersed therein, and the total content thereof was about 3 weight % of such metals in the binder. Furthermore, according to the X-ray diffraction analyses, there were detected CBN, TiN and AlN, however, borides such as $TiB_2$ were detected only in trace amounts.

For comparison, a sintered compact which contained neither Cu nor iron group metals was prepared, and the X-ray diffraction studies were made thereon, to reveal that the compact contained $TiB_2$ in large amounts in addition to CBN, TiN and AlN.

The above two compacts were formed as inserts for a cutting tool, and subjected to a cutting test. A WC-15 % Co cemented carbide punch of a Vickers hardness about 1,200 was cut under such conditions that the cutting speed was 18 m/min. the depth of cut was 0.2 mm and the revolution feed was 0.1 mm. For further comparison, a third insert was made from a marketed sintered compact having about 90 volume % of CBN bonded together with metals mainly of Co, and subjected to the same test as above. As a result, the maximum flank wear width of the sintered compact of the invention reached 0.10 mm while that of the compact having neither Cu nor iron group metals reached 0.15 mm, and the wear of the third compact reached 0.25 mm.

EXAMPLE 14

CBN powder of $3\mu$ in average particle size was mixed in an amount as shown in TABLE 9 with the same binder powder as used in EXAMPLE 1a.

In the same manner as in EXAMPLE 13, in a molybdenum capsule was placed a WC-6% Co cemented carbide substrate coated with a powder mixture comprising 50 volume % of CBN and the residue being a mixture of Ti(C.N), HfN and Al in a volume ratio of 5:3:2, and then on the substrate there were placed the powder mixture and another cemeneted carbide substrate having thereon 8 Cu-2 Ni alloy vacuum evaporated.

After being stopped with a molybdenum stop, the capsule was held in a super-pressure apparatus under a pressure of 50 kb at a temperature of 1,280° C. for 20 minutes. The Vickers hardness of the thus obtained sintered compacts were tabulated in TABLE 9 together with the Cu-Ni content in the binder. The compact was found to be firmly bonded with the substrate through an interface layer which contained CBN.

TABLE 9

| Compacts No. | CBN (vol. %) | Binders No. Used | Cu—Ni Content in Binder (wt. %) | Vickers hardness |
|---|---|---|---|---|
| 9A | 85 | 1 | 3 | 4,500 |
| 9B | 85 | 1 | 7 | 4,400 |
| 9C | 85 | 1 | 22 | 3,000 |
| 9D | 80 | 1 | 15 | 3,300 |
| 9E | 90 | 1 | 4 | 4,700 |
| 9F | 97 | 1 | 7 | 3,000 |
| 9G | 90 | 2 | 18 | 3,800 |
| 9H | 90 | 3 | 10 | 4,300 |
| 9I | 90 | 4 | 3 | 4,700 |
| 9J | 90 | 5 | 5 | 4,700 |
| 9K | 95 | 5 | 8 | 4,800 |

Considering now the compacts 9A, 9B and 9C, the last one containing 22 weight % of Cu-Ni in the binder had a lower hardness.

On the other hand, the larger the CBN content within a range, the harder the compact however, when the content reached as much as 97 volume %, the hardness of the resulting compact was lowered to 3,000. That is, the compact had an insufficient amount of binder therein so that the treating conditions used failed to provide a densely sintered structure. When examining the compacts 9G, 9H and 9I, in turn, the higher the Al content, the higher the hardness.

EXAMPLE 15

CBN powder of $3\mu$ in average particle size was mixed with the binder of TABLE 6 in a volume ratio of 87:13 to form a powder mixture.

In the same manner as in EXAMPLE 9, in a molybdenum capsule was placed the powder mixture, a $5\mu$ Cu foil having Co vacuum evaporated thereupon, and then a WC-10% Co cemented carbide substrate. After being stopped with a molybdenum stop, the capsule was treated in a super-pressure apparatus. The studies by an X-ray micro-analyzer showed that Cu and Co were contained in the binder in an amount of about 7 weight % in total. According to the X-ray diffraction studies, no boride was detected. The Vickers hardness of the compacts were all more than 4,000.

EXAMPLE 16

A powder mixture of $TiN_{0.65}$, Al, Cu and Co in a weight ratio of 70:26:3:1 was treated in the same manner as in EXAMPLE 1, to form a binder powder of $0.5\mu$ in average particle size.

CBN powder of $2\mu$ in average particle size was mixed with the binder powder, and sintered in the same manner as in EXAMPLE 13. According to the X-ray diffraction studies on the compact obtained, the existence of a small amount of borides was detected, however, neither metallic Cu nor Co was detected.

The compact was formed as an insert for a cutting tool, and was wet-cut with Inconel 718 under such conditions that the cutting speed was 100 m/min; the depth of cut was 0.2 mm and the revolution feed was 0.05 min. The maximum flank wear width reached 0.25 mm. For comparison, another insert was prepared from a marketed sintered compact having about 90 volume % of CBN bonded with metals mainly of Co. In the same cutting test as above, the insert had a wear width of 0.45 mm.

EXAMPLE 17

A shock wave-method WBN powder less than $1\mu$ in average particle size was mixed with the same binder powder as used in EXAMPLE 16 in a volume ratio of 85:15, and in the same manner as in EXAMPLE 13, placed in a molybdenum capsule and sintered. The resulting compact had a Vickers hardness of 4,800.

EXAMPLE 18

A powder mixture as shown in TABLE 10 was heated at 1,000° C. for 30 minutes in a vacuum furnace, and powdered, to provide a binder powder of $0.3\mu$ in average particle size.

A powder mixture of CBN of $3\mu$ in average particle size and each binder powder in a volume ratio of 90:10 was placed in contact with a WC-6% Co cemented carbide disk 10 mm in outside diameter and 3 mm in height coated with a powder mixture of 60 volume % of CBN and the residue a mixture of TiN and Al, in a molybdenum capsule. After being stopped with a molybdenum stop, the capsule was placed in a super-pressure apparatus. The pressure therein was first increased to 50 kb, then the temperature was raised to 1,250° C. and kept thereat for 20 minutes. The thus obtained sintered compacts using the binder was all densely sintered and had a Vickers hardness in the range of 4,000–4,700 by a measurement in which a 5-kg load was used.

TABLE 10

| Binders No. | Formulas | Binders (wt. %) | Al (wt. %) | Cu (wt. %) | Co (wt. %) |
|---|---|---|---|---|---|
| 33 | $VN_{0.90}$ | 68 | 20 | 10 | 2 |
| 34 | $VC_{0.95}$ | 66 | 10 | 20 | 4 |
| 35 | $NbN_{0.90}$ | 68 | 20 | 10 | 2 |
| 36 | $NbC_{0.95}$ | 66 | 10 | 20 | 4 |
| 37 | $TaC_{0.95}$ | 65 | 5 | 25 | 5 |
| 38 | $Nb(C_{0.2}, N_{0.7})$ | 67 | 15 | 15 | 3 |
| 39 | $(Ti_{0.8}, Ta_{0.2})(C_{0.2}, N_{0.7})$ | 67 | 15 | 15 | 3 |
| 40 | $(Ti_{0.7}, W_{0.3})(C_{0.7}, N_{0.7})$ | 66 | 10 | 20 | 4 |

What we claim is:

1. A sintered compact for use in a tool consisting essentially of:
   80 to 95 volume % of high pressure form boron nitride having an average particle size of less than 10 microns,
   the balance being a matrix comprising at least one binder material selected from the group consisting of a carbide, a nitride, and a carbonitride of a IVb and Vb transition metal in the Periodic Table, mixtures thereof and their solid solution compounds; and aluminum compounds, wherein the content of aluminum in said matrix is 5 to 30 weight %, and wherein the particles in said matrix are of a size of less than one micron.

2. A sintered compact for use in a tool as claimed in claim 1, wherein said matrix further comprises 1 to 50 weight % of copper.

3. A sintered compact for use in a tool as claimed in claim 1, wherein said matrix further comprises 1 to 50 weight % of copper and at least one iron group metal.

4. A sintered compact for use in a tool as claimed in claim 1, said sintered compact being bonded to a cemented carbide substrate through an intermediate layer having a thickness of less than 2 mm and comprising 0 to 70 volume % of high pressure form boron nitride, the balance comprising at least one binder material selected from the group consisting of a carbide, a nitride and a carbonitride of a IVb metal in the periodic table, mixtures thereof and their solid solution compounds, and more than 0.1 weight % of aluminum or silicon.

5. A sintered compact for use in a tool as claimed in claim 2, said sintered compact being bonded to a cemented carbide substrate through an intermediate layer having a thickness of less than 2 mm and comprising 0 to 70 volume % of high pressure form boron nitride, the balance comprising at least one binder material selected from the group consisting of a carbide, a nitride and a carbonitride of a IVb metal in the periodic table, mixtures thereof and their solid solution compounds, and more than 0.1 weight % of aluminum or silicon.

6. A sintered compact for use in a tool as claimed in claim 3, said sintered compact being bonded to a cemented carbide substrate through an intermediate layer having a thickness of less than 2 mm and comprising 0 to 70 volume % of high pressure form boron nitride, the balance comprising at least one binder material selected from the group consisting of a carbide, a nitride and a carbonitride of a IVb metal in the periodic table, mixtures thereof and their solid solution compounds, and more than 0.1 weight % of aluminum or silicon.

* * * * *